United States Patent
Hill et al.

(10) Patent No.: US 7,574,746 B2
(45) Date of Patent: Aug. 11, 2009

(54) ACCESS VALIDATION AND MANAGEMENT OF ACCESS PERMISSIONS TO REFERENCED SHARED RESOURCES IN A NETWORKED ENVIRONMENT

(75) Inventors: Charles R. Hill, Belmont, MA (US); David E. Wilson, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 11/095,852

(22) Filed: Mar. 31, 2005

(65) Prior Publication Data
US 2006/0224735 A1    Oct. 5, 2006

(51) Int. Cl.
*G06F 17/30* (2006.01)
(52) U.S. Cl. ................ 726/27; 726/29; 726/30
(58) Field of Classification Search ............ 726/27, 726/30, 29
See application file for complete search history.

(56) References Cited

U.S. PATENT DOCUMENTS

| | | |
|---|---|---|
| 5,930,801 A | 7/1999 | Falkenhainer et al. |
| 6,732,179 B1 | 5/2004 | Brown et al. |
| 2003/0135554 A1 | 7/2003 | Bellotti et al. |
| 2003/0200258 A1 | 10/2003 | Hayashi et al. |
| 2004/0030567 A1 | 2/2004 | Takeshita et al. |

OTHER PUBLICATIONS

Windows NT Server 4.0 Concepts and Planning Manual, Chapter 4—Managing Shared Resources and Resource Security, as printed out in year 2008.*
Activity-centric collaboratin tools on Lotusphere menu, printed out in year 2008.*
Going (Quick)Places with Charlie Hill, printed out in year 2008.*
Beyond predictable workflows: Enhancing productivity in artful business processes; Hill et al., year 2006.*
Employee connection; Australian tax office leverages technology to build culture and community; printed out in year 2008.*
Dynamic partial prefetch ranking in Hypermedia neighborhood; Javed I. Khan; year 2000.*
Efficient evaluation of shared predicates for XForms page access control Eunjung Lee,; Kyong-Jin Seo,; Tencon 2008-2008, Tencon 2008. IEEE Region 10 Conference Nov. 19-21, 2008, pp. 1-6.*

(Continued)

*Primary Examiner*—David Y Jung
(74) *Attorney, Agent, or Firm*—Stephen T. Keohane, Esq.; Steven M. Greenberg, Esq.; Carey Rodriguez Greenberg & Paul LLP

(57) ABSTRACT

A method, system and apparatus for automated management and validation of access permissions to referenced shared resources. A method for access validation and management of access permissions to referenced shared resources in a networked environment can include incorporating a reference to an underlying shared resource within a primary shared resource configured for distribution in the networked environment and specifying a designated viewer for the primary shared resource. It can be determined whether the designated viewer is permitted to access the underlying shared resource. Before providing the primary shared resource to the designated viewer, however, an author of the primary shared resource can be notified when the designated viewer is determined not to be permitted to access the underlying shared resource.

14 Claims, 2 Drawing Sheets

OTHER PUBLICATIONS

A Language Extension for Controlling Access to Shared Data Jones, A.K.; Liskov, B.H.; Software Engineering, IEEE Transactions on vol. SE-2, Issue 4, Dec. 1976 pp. 277-285.*

Knowledge access control policy language model for virtual enterprises Tsung-Yi Chen; Yuh-Min Chen; Hui-Chuan Chu; Chui-Cheng Chen; Industrial Engineering and Engineering Management, 2007 IEEE International Conference on Dec. 2-4, 2007, pp. 1903-1907.*

* cited by examiner

ACCESS VALIDATION AND MANAGEMENT OF ACCESS PERMISSIONS TO REFERENCED SHARED RESOURCES IN A NETWORKED ENVIRONMENT

BACKGROUND OF THE INVENTION

1. Statement of the Technical Field

The present invention relates to the management of access permissions to shared resources.

2. Description of the Related Art

Network computing has revolutionized the manner in which people can cooperate in furtherance of the completion of an objective. Prior to the widespread accessibility of network computing technologies, groups of individuals collaborating with one another were able only to operate in isolated, individualistic computing environments bridged only by direct, human-to-human contact, the telephone and the facsimile machine. Most importantly, the creation and management of computing resources such as documents, messages and databases could be shared only through the reduction of the shared resource to print and the manual passing of the print copy from person to person.

The ubiquity of network computing now permits the automated sharing of electronically shareable resources including the direct access by collaborators to the shared resources of the group. These resources can include centrally stored documents and databases as are commonplace in a collaborative environment. To the extent that the shared resources can be freely accessed by all parties to a networked environment without restriction, the sharing of resources can be seamless in nature. Most sophisticated networked environments, however, do not permit unfettered access to shared resources and provide at least a degree of access control to shared resources.

Generally, access control systems limit access to shared resources based upon the identity of user attempting access to the shared resource. The limited access can range from a complete denial of access to the shared resource to a restriction on the operations that can be performed on the resource, such as whether the resource can be edited, printed, deleted or otherwise modified. In many cases, the access limitations can be based not just on the express identity of the user attempting access, but also the access limitations can be based upon the location of the user, the class of user, or any other recognizable factor.

Oftentimes in a networked environment, a reference to an underlying shared resource can be incorporated in a second resource, such as an e-mail, instant message, and a shared document, to name a few. In this way, a viewer accessing the second resource can easily navigate to the underlying resource by merely selecting the link. Yet, problems can arise where the viewer does not enjoy suitable access rights to the linked, underlying resource. For example, when the viewer attempts to access the underlying shared resource by selecting the embedded link, the viewer can be denied access completely without providing any recourse to the viewer. In this circumstance, the viewer is left to manually resolve the denial of access by locating a party having rights to modify the access control limitations for the underlying resource in favor of the viewer.

SUMMARY OF THE INVENTION

The present invention addresses the deficiencies of the art in respect to managing access control to shared resources in a networked environment and provides a novel and non-obvious method, system and apparatus for automated management and validation of access permissions to referenced shared resources. In this regard, a method for access validation and management of access permissions to referenced shared resources in a networked environment can include incorporating a reference to an underlying shared resource within a primary shared resource configured for distribution in the networked environment and specifying a designated viewer for the primary shared resource. The primary shared resource can be an e-mail, an instant message, a chat session, and a shared document, to name a few. Likewise, the underlying shared resource can be an e-mail, an instant message, a chat session, and a shared document, to name a few.

It can be determined whether the designated viewer is permitted to access the underlying shared resource. To that end, the determining step can include consulting an access control list for the underlying shared resource to determine whether the designated viewer is permitted to access the underlying shared resource. Before providing the primary shared resource to the designated viewer, however, an author of the primary shared resource can be notified when the designated viewer is determined not to be permitted to access the underlying shared resource.

For instance, before providing the primary shared resource to the designated viewer, an author of the primary shared resource can be prompted to grant permissions to the designated viewer to view the underlying shared resource when the designated viewer is determined not to be permitted to access the underlying shared resource. As another example, before providing the primary shared resource to the designated viewer, an automated process can be performed to either request or grant permissions to the designated viewer to view the underlying shared resource when the designated viewer is determined not to be permitted to access the underlying shared resource.

The incorporating step can include incorporating multiple references to corresponding underlying shared resources within a primary shared resource configured for distribution in the networked environment. In this circumstance, the method further can include performing the determining step for each of the multiple references, and performing the notifying step when the designated viewer is determined not to be permitted to access at least one of the underlying shared resources. Similarly, the specifying step can include specifying multiple designated viewers for the primary shared resource. In this circumstance, the method further can include performing the determining step for each of the multiple designated viewers, and performing the notifying step when any of the multiple designated viewers are determined not to be permitted to access the underlying shared resource.

A method for access validation and management of access permissions to referenced shared resources in a networked environment also can include viewing a primary shared resource containing a link to an underlying shared resource, selecting the link to the underlying shared resource, determining whether requisite permissions exist to view the underlying shared resource, and, before providing a notification of deficient permissions, identifying a user able to grant the requisite permissions and providing a notification specifying the user in conjunction with the notification of deficient permissions.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for access validation and management of access permissions to referenced shared resources in a networked environment. In accordance with the present invention, a link to an underlying shared resource can be embedded within a primary shared resource such as an e-mail, instant message, chat room posting, or shared document to name a few. Notably, the shared resource can have one or more associated access controls which specify a requisite set of permissions for authorized viewers. In any event, the primary shared resource can be designated for viewing by one or more viewers in the networked environment and the primary shared resource can be released for viewing by one or more designated viewers.

Prior to releasing the primary shared resource for viewing by the one or more designated viewers, however, it can be determined whether each of the designated viewers is permitted to access the underlying shared resourced referenced by the link based upon the associated access controls. If not, the author of the primary shared resource can be notified of the permissions deficiency and afforded an opportunity to correct the deficiency. Likewise, once the primary shared resource has been viewed by the designated viewer, the viewer can be validated prior to opening the link to the underlying resource. To the extent that the permissions of the viewer are deficient, the identity of a user able to modify the permissions can be provided to the viewer.

Figure 1:
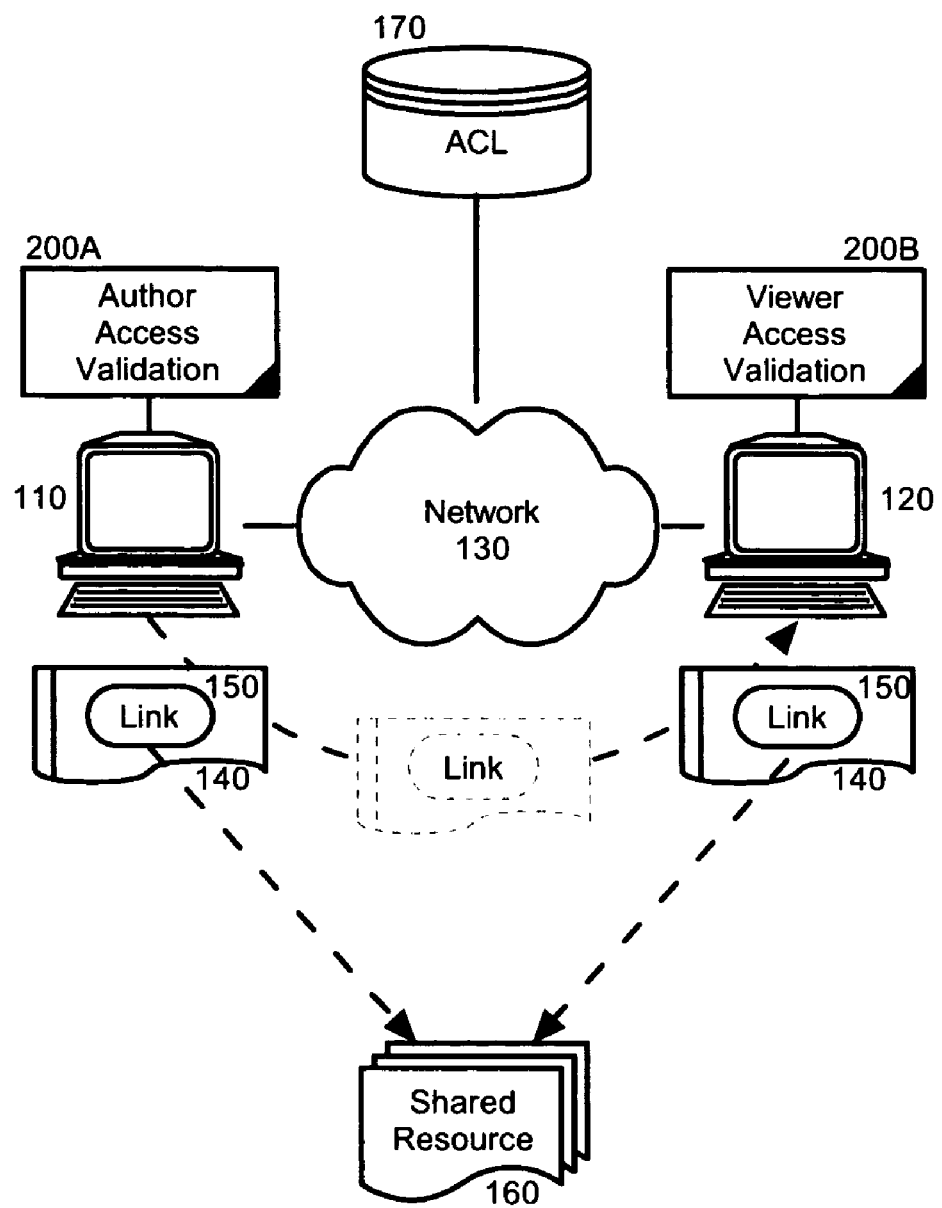
FIG. 1 is a schematic illustration of a networked environment configured for access validation and management of access permissions to referenced shared resources in the networked environment.

In more particular explanation, FIG. 1 is a schematic illustration of a networked environment configured for access validation and management of access permissions to referenced shared resources in the networked environment. The networked environment can include at least one authoring platform 110 coupled to at least one viewing platform 120 over a computer communications network 130. (Only a single authoring platform 110 and viewing platform has been shown for the purpose of illustrative simplicity) The authoring computer 110 can be configured to create, edit or otherwise modify a primary shared resource 140 which can be shared with one or more viewing platforms 120.

Importantly, one or more links 150 to one or more underlying shared resources 160 can be incorporated as part of the content of the primary shared resource 140. Viewers can access the underlying shared resources 160 by selecting a corresponding one of the links 150. In this regard, where the underlying shared resource 160 is a shared document, the shared document can be loaded and rendered in a viewer. By comparison, where the underlying shared resource 160 is a database, the database can be activated for access by the viewer. In any case, the viewing of the underlying shared resources 160 can be limited by a set of requisite permissions specified within a data store of access control information 170.

Optionally, one or more roles (not shown) can be defined in the primary shared resource 140. When one or more of the links 150 to an underlying shared resource 160 is added to the primary shared resource 140, role-appropriate permissions can be granted to all designated recipients having the role. In this regard, the roles can be mapped to permission sets in the networked environment which has been configured to embed links 150 to shared resources 160 within an underlying shared resource 160. Thus, the role mechanism can be extended to propagate downwards from the abstract level to all shared resources referenced by links in other underlying shared resources.

In accordance with the present invention, the authoring platform 110 can include author access validation logic 200A. The author access validation logic 200A, at the time of authorship of the primary shared resource 140, can analyze each of the links 150 and the corresponding designated viewers of the primary shared resource 140 to determine whether the designated viewers enjoy the requisite permissions necessary to view the underlying shared resources 160 referenced by the links 150. Where an incompatibility is detected as between a designated viewer and a specified one of the shared resources 160, the author can be prompted of the incompatibility and afforded an opportunity to rectify the incompatibility. Alternatively, an automated process automatically can rectify the incompatibility, for instance by requesting or granting permissions to the designated viewer so that the designated viewer can access the underlying resources 160 referenced by the links 150.

Similar to the authoring platform 110, the viewing platform 120 can include viewer access validation logic 200B. The viewer access validation logic 200B, at the time of viewing of the primary shared resource 140, can analyze each of the links 150 to determine whether the viewer enjoys the requisite permissions necessary to view the underlying shared resources 160 referenced by the links 150. Where an incompatibility is detected as between the viewer and a specified one of the shared resources 160, the viewer can be prompted of the incompatibility and afforded an opportunity to rectify the incompatibility by contacting a specified user able to grant the requisite permissions to the viewer.

Figure 2A:
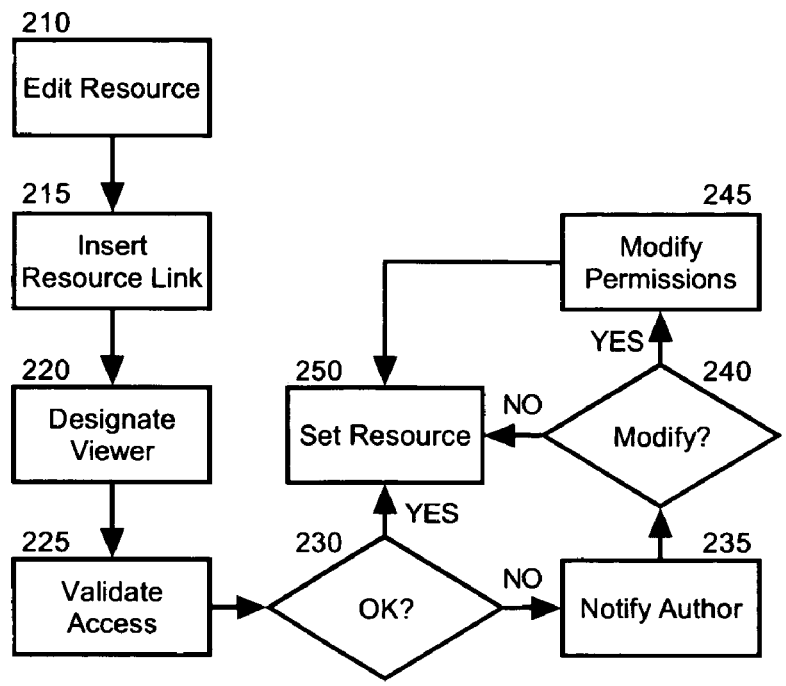
FIG. 2A is a flow chart illustrating a process for author initiated access validation and management of access permissions to referenced shared resources; and, FIG. 2B is a flow chart illustrating a process for viewer initiated access validation and management of access permissions for referenced shared resources.
Figure 2B:
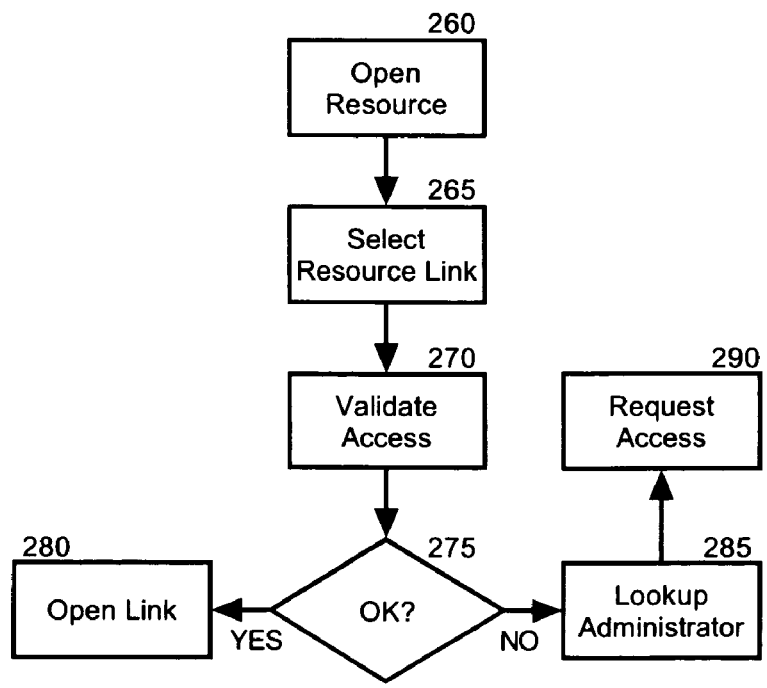

To further illustrate a particular aspect of the present invention, FIG. 2A is a flow chart illustrating a process for author initiated access validation and management of access permissions to referenced shared resources and FIG. 2B is a flow chart illustrating a process for viewer initiated access validation and management of access permissions for referenced shared resources. Referring first to FIG. 2A, a primary shared resource can be created, edited or otherwise modified in block 210. In block 215 a link to an underlying shared resource can be included in the primary shared resource. For example, a hyperlink to the underlying shared resource can be embedded in the primary shared resource.

In block 220, a designated viewer for the primary shared resource can be specified. In this regard, to the extent that the primary shared resource is an e-mail or instant message, the identity of the designated recipient for the e-mail or instant message can be specified. Subsequently, in block 225, the permissions for the designated viewer can be compared to a set of permissions required by the underlying shared resource. If in decision block 230 it is determined that the permissions required by the underlying shared resource are satisfied by the permissions for the designated viewer, in block 250 the primary shared resource can be set, which can include publication for viewing by the designated viewer, or transmission directly to the designated viewer.

If in decision block 230, it is determined that the permissions required by the underlying shared resource are not satisfied by the permissions for the designated viewer, in block 235 the author of the primary shared resource can be notified of the deficiency. Optionally, in decision block 240 the author can be afforded the opportunity to rectify the deficiency by granting the requisite permissions in block 245. Alternatively, where the author is not permitted to modify the permissions for the underlying shared resource, the author can be afforded the opportunity to request of a suitable user that permissions be granted to the designated viewer. In this way, the primary shared resource need not be set without regard to whether or not the designated recipient can access the linked underlying shared resource.

As an alternative to the sub-process of blocks 235 through 240, an automated process can be used to resolve access permissions. Specifically, a service can operate to resolve the implied request for access based on the sharing action, within established security policies. This might be manifested by the author choosing a preference in advance that specifies that the author prefers to automatically attempt to add access for designated recipients when links are shared by the author. Subsequently, when the author adds a link to a primary shared resource, access can be managed automatically. As an example, the automatic action can include requesting access to the referenced resource from the owner of the reference resource.

Turning now to FIG. 2B, once a primary shared resource has been received for viewing by a designated recipient, in block 260 the primary shared resource can be opened for viewing. In block 265, an embedded link to an underlying resource can be selected for activation. Subsequently, in block 270 the permissions for the designated viewer can be compared to a set of permissions required by the underlying shared resource. In decision block 275 it can be determined whether the permissions required by the underlying shared resource are satisfied by the permissions for the designated viewer. If so, in block 280 the link to the underlying shared resource can be activated.

If in decision block 275, it is determined that the permissions required by the underlying shared resource are not satisfied by the permissions for the designated viewer, in block 285 the viewer can be provided with the contact information for the user assigned the right to grant the requisite permissions to the underlying shared resource. Additionally, in block 290, a request for permission to access the underlying shared resource can be forwarded to the user. In this way, a manual discovery of the user need not be undertaken by the designated viewer.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for access validation and management of access permissions to referenced shared resources in a networked environment, the method comprising the steps of:
   embedding a reference to an underlying shared resource within a primary shared resource configured for distribution in the networked environment;
   specifying a designated viewer for said primary shared resource;
   determining whether said designated viewer is permitted to access said underlying shared resource; and,
   before providing said primary shared resource to said designated viewer, prompting an author of said primary shared resource when said designated viewer is determined not to be permitted to access said underlying shared resource.

2. The method of claim 1, wherein said incorporating step comprises the step of incorporating multiple references to corresponding underlying shared resources within a primary shared resource configured for distribution in the networked environment, and wherein the method further comprises the steps of performing said determining step for each of said multiple references, and performing said notifying step when said designated viewer is determined not to be permitted to access at least one of said underlying shared resources.

3. The method of claim 1, wherein said determining step comprises the step of consulting an access control list for said underlying shared resource to determine whether said designated viewer fulfills a role which is permitted to access said underlying shared resource.

4. The method of claim 1, wherein said determining step comprises the step of consulting an access control list for said underlying shared resource to determine whether said designated viewer is permitted to access said underlying shared resource.

5. The method of claim 1, wherein said notifying step comprises the step of, before providing said primary shared resource to said designated viewer, prompting an author of said primary shared resource to grant permissions to said designated viewer to view said underlying shared resource when said designated viewer is determined not to be permitted to access said underlying shared resource.

6. The method of claim 1, wherein each of said primary and underlying shared resources is one of an e-mail, an instant message, a chat session, and a shared document.

7. The method of claim 1, further comprising the step of, in lieu of notifying said author of said primary shared resource when said designated viewer is determined not to be permitted to access said underlying shared resource, automatically requesting permission from an owner of said underlying shared resource for said designated viewer to access said underlying shared resource.

8. A machine readable storage having stored thereon a computer program for access validation and management of access permissions to referenced shared resources in a networked environment, the computer program comprising a routine set of instructions which when executed by a machine causes the machine to perform the steps of:

embedding a reference to an underlying shared resource within a primary shared resource configured for distribution in the networked environment;

specifying a designated viewer for said primary shared resource;

determining whether said designated viewer is permitted to access said underlying shared resource; and, before providing said primary shared resource to said designated viewer, prompting an author of said primary shared resource when said designated viewer is determined not to be permitted to access said underlying shared resource.

9. The machine readable storage of claim 8, wherein said incorporating step comprises the step of incorporating multiple references to corresponding underlying shared resources within a primary shared resource configured for distribution in the networked environment, and wherein the method further comprises the steps of performing said determining step for each of said multiple references, and performing said notifying step when said designated viewer is determined not to be permitted to access at least one of said underlying shared resources.

10. The machine readable storage of claim 8, wherein said determining step comprises the step of consulting an access control list for said underlying shared resource to determine whether said designated viewer fulfills a role which is permitted to access said underlying shared resource.

11. The machine readable storage of claim 8, wherein said determining step comprises the step of consulting an access control list for said underlying shared resource to determine whether said designated viewer is permitted to access said underlying shared resource.

12. The machine readable storage of claim 8, wherein said notifying step comprises the step of, before providing said primary shared resource to said designated viewer, prompting an author of said primary shared resource to grant permissions to said designated viewer to view said underlying shared resource when said designated viewer is determined not to be permitted to access said underlying shared resource.

13. The machine readable storage of claim 8, wherein each of said primary and underlying shared resources is one of an e-mail, an instant message, a chat session, and a shared document.

14. The machine readable storage of claim 8, further comprising the step of, in lieu of notifying said author of said primary shared resource when said designated viewer is determined not to be permitted to access said underlying shared resource, automatically requesting permission from an owner of said underlying shared resource for said designated viewer to access said underlying shared resource.

\* \* \* \* \*